United States Patent
Kim et al.

(10) Patent No.: US 10,248,844 B2
(45) Date of Patent: Apr. 2, 2019

(54) METHOD AND APPARATUS FOR FACE RECOGNITION

(71) Applicant: Samsung Electronics Co., Ltd., Suwon-si, Gyeonggi-do (KR)

(72) Inventors: Jungbae Kim, Seoul (KR); Ruslan Salakhutdinov, Toronto (CA); Jaejoon Han, Seoul (KR); Byungin Yoo, Seoul (KR)

(73) Assignees: SAMSUNG ELECTRONICS CO., LTD., Gyeonggi-Do (KR); THE GOVERNING COUNCIL OF THE UNIVERSITY OF TORONTO, Toronto, ON (CA)

( * ) Notice: Subject to any disclaimer, the term of this patent is extended or adjusted under 35 U.S.C. 154(b) by 2 days.

(21) Appl. No.: 15/189,454

(22) Filed: Jun. 22, 2016

(65) Prior Publication Data
US 2017/0046563 A1    Feb. 16, 2017

(30) Foreign Application Priority Data
Aug. 10, 2015  (KR) .................. 10-2015-0112589

(51) Int. Cl.
*G06K 9/00*   (2006.01)
*G06K 9/62*   (2006.01)
*G06K 9/46*   (2006.01)

(52) U.S. Cl.
CPC ..... *G06K 9/00275* (2013.01); *G06K 9/00241* (2013.01); *G06K 9/00288* (2013.01);
(Continued)

(58) Field of Classification Search
CPC .................. G06K 9/6272; G06K 9/00288
See application file for complete search history.

(56) References Cited

U.S. PATENT DOCUMENTS

| | | | | |
|---|---|---|---|---|
| 2009/0310828 | A1* | 12/2009 | Kakadiaris | G06K 9/00208 382/118 |
| 2012/0288166 | A1* | 11/2012 | Sun | G06K 9/00281 382/118 |

(Continued)

FOREIGN PATENT DOCUMENTS

| | | |
|---|---|---|
| KR | 20050017067 A | 2/2005 |
| KR | 20050091558 A | 9/2005 |
| KR | 20100096686 A | 9/2010 |

OTHER PUBLICATIONS

Suh et al (Robust Albedo Estimation from a Facial Image With Cast Shadow Under General Unknown Lighting, IEEE Transactions on Image Processing, vol. 22, No. 1,) (Year: 2013).*

(Continued)

*Primary Examiner* — Oneal R Mistry
(74) *Attorney, Agent, or Firm* — Harness, Dickey & Pierce, P.L.C.

(57) ABSTRACT

A training method of training an illumination compensation model includes extracting, from a training image, an albedo image of a face area, a surface normal image of the face area, and an illumination feature, the extracting being based on an illumination compensation model; generating an illumination restoration image based on the albedo image, the surface normal image, and the illumination feature; and training the illumination compensation model based on the training image and the illumination restoration image.

16 Claims, 12 Drawing Sheets

(52) U.S. Cl.
CPC ......... *G06K 9/4628* (2013.01); *G06K 9/4661* (2013.01); *G06K 9/6262* (2013.01); *G06K 9/6272* (2013.01)

(56) References Cited

U.S. PATENT DOCUMENTS

| | | | |
|---|---|---|---|
| 2014/0079295 A1 | 3/2014 | Yoon et al. | |
| 2015/0178554 A1* | 6/2015 | Kanaujia | G06T 19/20 382/118 |
| 2015/0379348 A1* | 12/2015 | Whritenor | G06K 9/00597 382/117 |
| 2018/0046854 A1* | 2/2018 | Kittler | G06K 9/00288 |

OTHER PUBLICATIONS

Sun et al., "Deep Learning Face Representation by Joint Identification-Verification," arXiv.org, arXiv:1406.4773v1 [cs.CV], Jun. 18, 2014.

Yichuan Tang et al: "Deep Lambertian Networks" Jun. 27, 2012, XP055326803, Retrieved from the Internet: URL:http://www.cs.toronto.edu/-fritz/absps/dln.pdf.

Barron J T et al: "Shape, albedo, and illumination from a single image of an unknown object" Computer Vision and Pattern Recognition (CVPR), 2012 IEEE Conference on, IEEE, Jun. 16, 2012, pp. 334-341, XP032232092.

Siu-Yeung Cho et al: "Robust face recognition using generalized neural reflectance model", Neural Computing and Applications, Springer-Verlag, LO, vol. 15, No. 2, Apr. 1, 2006, pp. 170-182, XP019381266.

Basri R et al.: "Lambertian reflectance and linear subspaces", IEEE Transactions on Pattern Analysis and Machine Intelligence, IEEE Computer Society, USA, vol. 25, No. 2, Feb. 1, 2003, pp. 218-233, XP011095633.

Extended European Search Report for Corresponding European Patent Application No. 16180114.7 dated Mar. 17, 2017.

* cited by examiner

METHOD AND APPARATUS FOR FACE RECOGNITION

CROSS-REFERENCE TO RELATED APPLICATION

This application claims under 35 U.S.C. § 119 to Korean Patent Application No. 10-2015-0112589, filed on Aug. 10, 2015, in the Korean Intellectual Property Office, the entire contents of which are incorporated herein by reference.

BACKGROUND

1. Field

At least one example embodiment relates to face recognition technology for recognizing a face present in an image.

2. Description of the Related Art

Face recognition technology is considered a convenient and competitive bio-recognition technology that may verify a target without contact with the target, dissimilar to other recognition technologies, for example, fingerprint and iris recognition, that require a user to perform a certain motion or an action. Such a face recognition technology has been widely used in various application fields, for example, security systems, mobile authentication, and multimedia searches due to convenience and effectiveness of the face recognition technology. However, a performance of the face recognition technology may be sensitive to a face pose and a facial expression of a user, an occlusion, a change in illumination, and the like.

The performance of the face recognition technology may be affected by a performance of a pattern classifier identifying a registered face and a non-registered face. The pattern classifier may be trained based on, for example, a method using a neural network model. The neural network model may be a model obtained by modeling a feature of a human nerve cell through a mathematical expression, and may have an ability to classify an input pattern as a predetermined group. To solve an issue that the input pattern is classified as a predetermined group, the neural network model may use an algorithm imitating an ability of human learning. Based on the algorithm, the neural network model may generate a mapping between the input pattern and an output pattern, which may be expressed as a learning ability of the neural network model.

SUMMARY

Some example embodiments relate to a training method of training an illumination compensation model.

According to at least some example embodiments, a training method of training an illumination compensation model includes extracting, from a training image, an albedo image of a face area, a surface normal image of the face area, and an illumination feature, the extracting being based on an illumination compensation model; generating an illumination restoration image based on the albedo image, the surface normal image, and the illumination feature; and training the illumination compensation model based on the training image and the illumination restoration image.

The generating may include generating the illumination restoration image by applying the albedo image, the surface normal image, and the illumination feature to a Lambertian model.

The illumination compensation model may be based on a convolutional neural network (CNN) model applied to an encoder of an auto-encoder.

The training may include updating a parameter of the illumination compensation model based on a difference between the training image and the illumination restoration image.

The extracting may further include extracting a mask image of the face area from the training image, based on the illumination compensation model.

The method may further comprise generating a mask restoration image based on the illumination restoration image and the mask image, wherein the training includes training the illumination compensation model based on the training image and the mask restoration image.

According to at least some example embodiments of the inventive concepts, a training method of training a face recognition model may include extracting, from a training image, an albedo image of a face area and a surface normal image of the face area, the extracting being based on an illumination compensation model; inputting the albedo image and the surface normal image to a face recognition model; obtaining an estimated value from the face recognition model based on the albedo image and the surface normal image; and training the face recognition model based on the estimated value and a desired value corresponding to the training image.

The training may include updating a parameter of the face recognition model based on a difference between the estimated value of the face recognition model and the desired value.

The face recognition model may be based on a convolutional neural network (CNN) model.

According to at least some example embodiments, a face recognition method may include extracting, from an input image, an albedo image of a face area and a surface normal image of the face area, the extracting being based on an illumination compensation model; inputting the albedo image and the surface normal image to a face recognition model; and determining a face recognition result based on an output value of the face recognition model.

The illumination compensation model and the face recognition model may be based on a convolutional neural network (CNN) model.

The method may further include outputting, from the face recognition model, an identification value corresponding to the input image based on the albedo image and the surface normal image.

The albedo image and the surface normal image may be independent of an illumination component comprised in the input image.

The albedo image may indicate a texture component of a face area without regard to an illumination of the face area, and the surface normal image may indicate a three-dimensional (3D) shape component of the face area without regard to the illumination.

According to at least some example embodiments, a computer program embodied on a non-transitory computer readable medium is configured to control a processor to perform, extracting, from a training image, an albedo image of a face area, a surface normal image of the face area, and an illumination feature, the extracting being based on an illumination compensation model,generating an illumination restoration image based on the albedo image, the surface normal image, and the illumination feature, and training the illumination compensation model based on the training image and the illumination restoration image.

According to at least some example embodiments, a face recognition apparatus includes a memory storing instructions; and one or more processors configured to execute the instructions such that the one or more processors are configured to, extract, from an input image, an albedo image of a face area and a surface normal image of the face area, the extraction being based on an illumination compensation model, input the albedo image and the surface normal image to a face recognition model, and determine a face recognition result based on an output value of the face recognition model.

The one or more processors may be configured to execute the instructions such that the one or more processors are configured to extract an illumination component and an occlusion component from the input image based on the illumination compensation model.

According to at least some example embodiments, a training apparatus may include a memory storing instructions; and one or more processors configured to execute the instructions such that the one or more processors are configured to, extract, from a training image, an albedo image of a face area, a surface normal image of the face area, and an illumination feature, the extraction being based on an illumination compensation model, generate an illumination restoration image based on the albedo image, the surface normal image, and the illumination feature, and train the illumination compensation model based on the training image and the illumination restoration image.

The one or more processors may be configured to execute the instructions such that the one or more processors are configured to, input the albedo image and the surface normal image to a face recognition model, obtain an estimated value from the face recognition model based on the albedo image and the surface normal image, and train the face recognition model based on the estimated value and a desired value corresponding to the training image.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
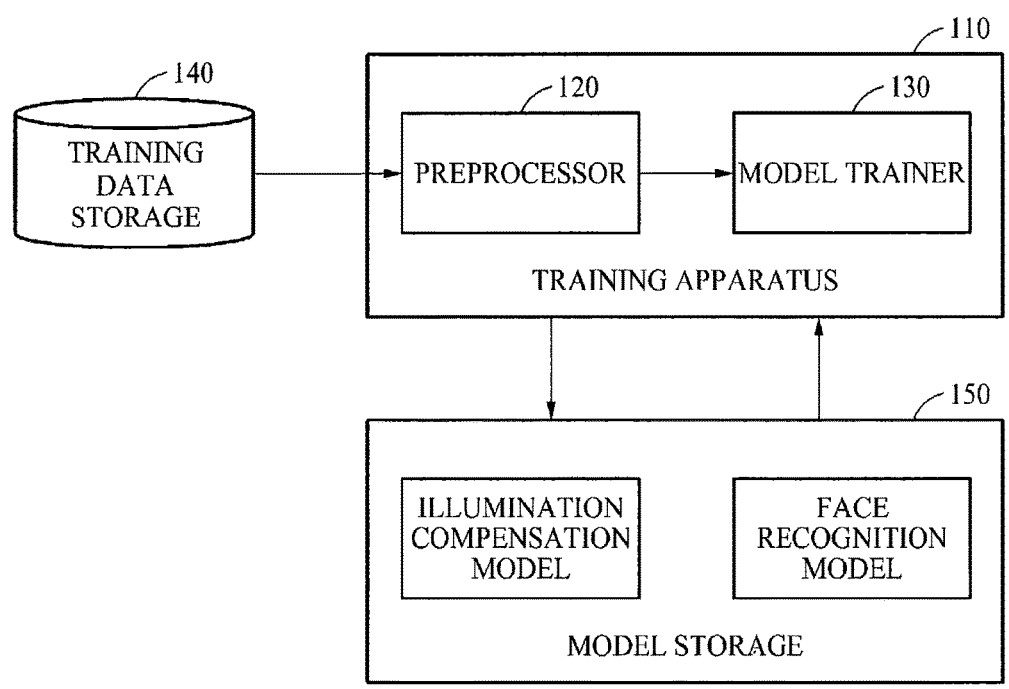
FIG. 1 illustrates an example of a training apparatus according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, hut to the contrary, example embodiments are to cover all modifications, equivalents, and alternatives falling within, the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 illustrates an example of a training apparatus according to at least one example embodiment. A training apparatus 110 trains models used for face recognition based on training data. Here, training refers to a machine learning and the training data stored in a training data storage 140 includes various image data. For example, the training data may include image data of various people and image data of which a face of a person is photographed in various illumination environments. In addition, image data having various occlusions, for example, when glasses, sunglasses, or a mask exist in a face area, the face area may be used as the training data. Hereinafter, the image data included in the training data is referred to as a training image.

Referring to FIG. 1, the training apparatus 110 includes a preprocessor 120 and a model trainer 130. According to at least one example embodiment, the preprocessor 120 and the model trainer 130 may be implemented by at least one processor.

According to at least one example embodiment, the training apparatus 110 may include or be implemented by one or more circuits or circuitry (e.g., hardware) specifically structured to carry out some or all of the operations described herein as being performed by the training apparatus 110 (or an element thereof). According to at least one example embodiment, the training apparatus 110 may include or be implemented by a memory and one or more processors executing computer-readable code (e.g., software) that is stored in the memory and includes instructions corresponding to some or all of the operations described herein as being performed by the training apparatus 110 (or an element thereof). According to at least one example embodiment, the training apparatus 110 may be implemented by, for example, a combination of the above-referenced hardware and processors executing computer-readable code.

The preprocessor 120 extracts an albedo image of a face area, a surface normal image of the face area, and an illumination feature from a training image based on an illumination compensation model. The illumination feature refers to a feature with respect to an external light appearing in an input image and includes a feature with respect to a direction and intensity of light. The albedo image refers to an image with respect to a diffuse reflectivity indicating a degree to which light is reflected from a face surface. The face normal image of the face area refers to an image indicating a feature with respect to a perpendicular direction to a tangent plane of a point in each point of the face surface. For example, the surface normal. image may indicate information on three surface normal vectors with respect to each direction of an x-axis, a y-axis and a z-axis.

The albedo image and the surface normal image may be generated independently of (e.g., without regard to) an illumination and have a proper independent of the illumination. For example, the albedo image and the surface normal image may be identical even when an illumination component of the input image is bright or dark. The albedo image indicates a texture component of a face irrelevant to the illumination, and the surface normal image indicates a three-dimensional (3D) shape component of the face irrelevant to the illumination.

The model trainer 130 trains the illumination compensation model and a face recognition model. Based on a training process, parameters of the illumination compensation model and parameters of the face recognition model may be improved or, alternatively, optimized.

According to at least one example embodiment, the model trainer 130 may train the illumination compensation model based on a deformation model of an auto-encoder. The auto-encoder refers to a neural network model enabling a desired output to be identical to an input. The auto-encoder may include an encoder provided in an input layer and encoding layers, and a decoder provided in an output layer and decoding layers. The auto-encoder may have a neural network structure in which an output value of the encoder is input to the decoder and the decoder outputs the output value identical to an input value input to the encoder. The model trainer 130 may refer to the deformation model of the auto-encoder and may use a model in which a convolutional neural network (CNN) model is used as the encoder and a Lambertian model is used as the decoder. In this example, the encoder may correspond to the illumination compensation model. A description of the deformation model of the auto-encoder will be provided with reference to FIG. 3.

The model trainer 130 generates an illumination restoration image based on features extracted by the illumination compensation model. The model trainer 130 may reconstruct the illumination restoration image by applying the albedo image, the surface normal image, and the illumination feature to the Lambertian model. The model trainer 130 may determine a loss function for training based on a difference between the training image and the illumination restoration image, and update the parameters of the illumination compensation model based on the loss function. For example, the model trainer 130 may adjust the parameters of the illumination compensation model to decrease a value of the loss function.

In another example, the preprocessor 120 extracts a mask image in addition to the albedo image of the face area, the surface normal image of the face area, and the illumination feature from the training image. The model trainer 130 may reconstruct the illumination restoration image based on the albedo image, the surface normal image, and the illumination feature, and generate a mask restoration image by combining the illumination restoration image and the mask image. The model trainer 130 may determine the loss function based on a difference between the training image and the mask restoration image and update the parameters of the illumination compensation model based on the loss function.

The model trainer 130 may train the face recognition model as follows. The model trainer 130 may input the albedo image and the surface normal image extracted by the illumination compensation model to the face recognition model and may obtain an estimated value from the face recognition model. For example, the face recognition model may be based on the CNN model and may output an identification value, for example, an identification (ID), corresponding to the training image, as the estimated value. The model trainer 130 may train the face recognition model based on the estimated value of the face recognition model and a desired value corresponding to the training image. The model trainer 130 may determine the loss function based on a difference between the estimated value of the face recognition model and the desired value, and update the parameters of the face recognition model based on the loss function.

The illumination compensation model and the face recognition model, the training of each of which is completed through the aforementioned process, may be stored in a model storage 150.

Figure 2:
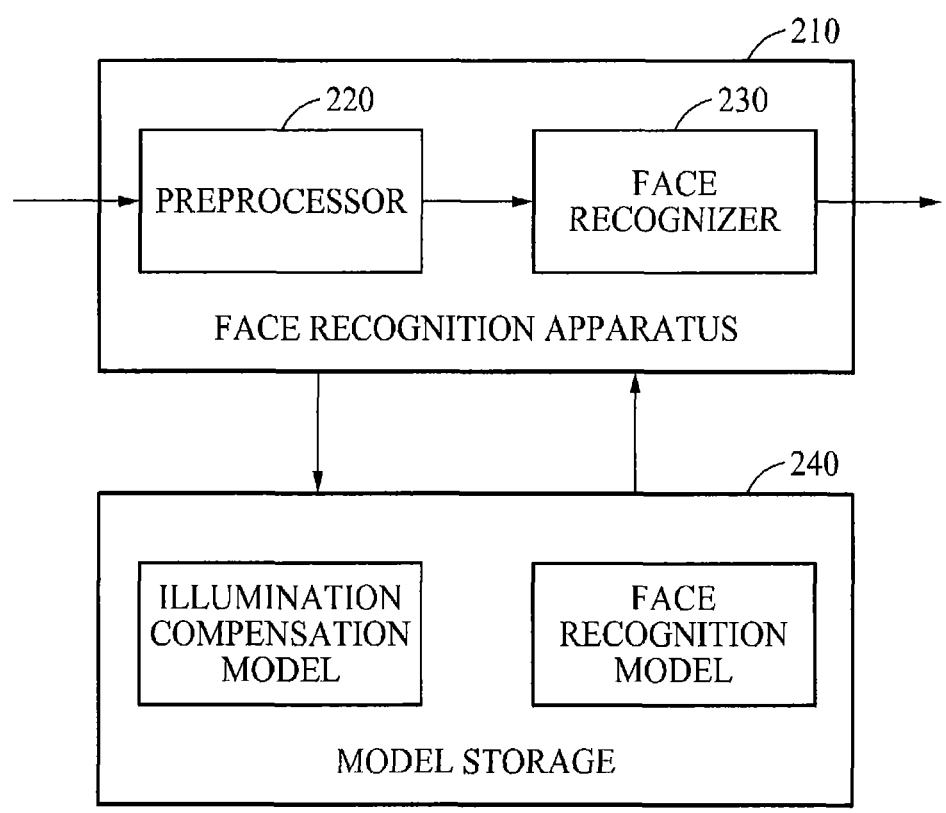
FIG. 2 illustrates an example of a face recognition apparatus according to at least one example embodiment.

FIG. 2 illustrates an example of a face recognition apparatus according to at least one example embodiment. A face recognition apparatus 210 may be utilized in various application areas, examples of which include, but are not limited to, a monitoring/security system, a mobile device authentication, and multimedia search and classification. Also, the face recognition apparatus 210 may be used to implement a complex biometric authentication system through a combination with a fingerprint recognition apparatus (not shown).

The face recognition apparatus 210 may perform face recognition including face authentication on an input image obtained by a digital still camera or a video camera. For example, the face recognition apparatus 210 may identify a user appearing in the input image or verify whether the user appearing in the input image is identical to a user appearing in a predetermined enrolled image. An enrolled image may be enrolled prior to the face recognition performed, stored in a database in advance, and may include a face image of at least one user. Hereinafter, for ease and convenience of description, it is assumed that an input image includes one face area. However, the present disclosure is not limited there to.

The face recognition apparatus 210 may perform preprocessing to remove an illumination component and an occlusion component from the input image and perform the face recognition based on the input image from which the illumination component and the occlusion component are removed. The face recognition apparatus 210 may perform the aforementioned preprocessing and the face recognition based on the models trained in advance by a training apparatus in FIG. 1.

Referring to FIG. 2, the face recognition apparatus 210 includes a preprocessor 220 and a face recognizer 230. According to at least one example embodiment, the preprocessor 220 and the face recognizer 230 may be implemented by at least one processor.

According to at least one example embodiment, the face recognition apparatus 210 may include or be implemented by one or more circuits or circuitry (e.g., hardware) specifically structured to carry out some or all of the operations described herein as being performed by the face recognition apparatus 210 (or an element thereof). According to at least one example embodiment, the face recognition apparatus 210 may include or be implemented by a memory and one or more processors executing computer-readable code (e.g., software) that is stored in the memory and includes instructions corresponding to some or all of the operations described herein as being performed by the face recognition apparatus 210 (or an element thereof). According to at least one example embodiment, the face recognition apparatus 210 may be implemented by, for example, a combination of the above-referenced hardware and processors executing computer-readable code.

The preprocessor 220 may extract the illumination component and the occlusion component from the input image based on an illumination compensation model stored in a model storage 240. For example, the preprocessor 220 may extract an albedo image of a face area and a surface normal image of the face area from the input image based on the illumination compensation model. The illumination compensation model may be trained in advance based on the descriptions with reference to FIG. 1.

The face recognizer 230 may perform the face recognition based on the albedo image and the surface normal image of the face area irrelevant to the illumination component and the occlusion component of the input image by the preprocessor 220. The face recognizer 230 may input the albedo image and the surface normal image extracted by the preprocessor 220 to the face recognition model and may determine a face recognition result based on an output value of the face recognition model. For example, the face recognition model may output an identification value corresponding to the input image. The face recognition model may be trained in advance based on the descriptions with reference to FIG. 1.

In another example, the face recognition apparatus 210 may determine whether a user appearing in the input image is identical to a user appearing in an enrolled image by comparing the input image to a pre-enrolled image. The preprocessor 220 may extract the albedo image and the surface normal image based on the illumination compensation model with respect to the input image in addition to the enrolled image. The face recognizer 230 may obtain a final feature value corresponding to the enrolled image by inputting the extracted albedo image and the surface normal image to the face recognition model. The face recognizer 230 may determine a similarity between a final feature value with respect to the input image and a final feature value with respect to the enrolled image and determine the face recognition result based on the similarity. For example, the face recognizer 230 may use an output value, as the final feature value, from a predetermined layer among a plurality of layers included in the face recognition model.

As described above, the face recognition apparatus 210 may have robustness to perform the face recognition on an illumination and an occlusion by extracting the illumination component and the occlusion component from the input image and performing the face recognition on the input image from which the illumination component and the occlusion component are removed. In addition, the face recognition apparatus 210 may use the albedo image and the surface normal image irrelevant to an illumination, and the face recognition model and the illumination compensation model based on deep learning for the face recognition, thereby enhancing a recognition rate of the face recognition.

Figure 3:
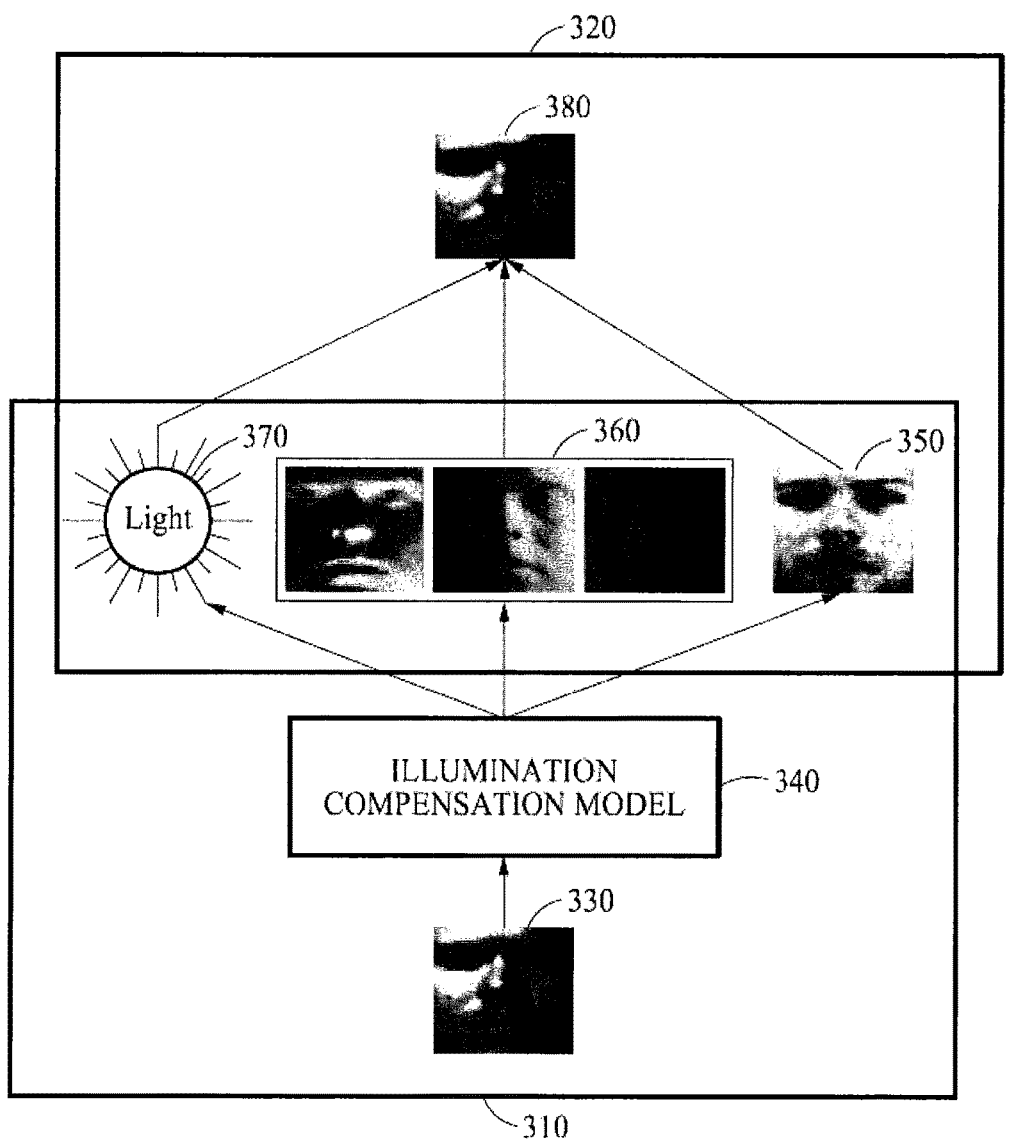
FIG. 3 illustrates an example of a deformation model of an auto-encoder according to at least one example embodiment.

FIG. 3 illustrates an example of a deformation model of an auto-encoder according to at least one example embodiment.

Referring to FIG. 3, a deformation model 300 of an auto-encoder includes an encoder 310 and a decoder 320. An output of the encoder 310 may be input to the decoder 320. In the encoder 310, a training image 330 is input to an illumination compensation model 340 based on a convolutional neural network (CNN) model, and the illumination compensation model 340 may output an albedo image 350, a surface normal image 360, and an illumination feature 370 with respect to the training image 330. The surface normal image 360 represents a 3D shape of a face when light is reflected from each direction of an x-axis, a y-axis, and a z-axis. The surface normal image 360 may be represented as three normal images with respect to each direction of the x-axis, the y-axis, and the z-axis.

According to at least one example embodiment, the encoder 310 and/or decoder 320 may include or be implemented by one or more circuits or circuitry (e.g., hardware) specifically structured to carry out some or all of the operations described herein as being performed by the encoder 310 and/or decoder 320 (or an element thereof). According to at least one example embodiment, the encoder 310 and/or decoder 320 may include or be implemented by a memory and one or more processors executing computer-readable code (e.g., software) that is stored in the memory and includes instructions corresponding to some or all of the operations described herein as being performed by the encoder 310 and/or decoder 320 (or an element thereof). According to at least one example embodiment, the encoder 310 and/or decoder 320 may be implemented by, for example, a combination of the above-referenced hardware and processors executing computer-readable code.

According to at least some example embodiments, one or both of the encoder 310 and decoder 320 may be elements of an auto-encoder, and the auto-encoder may be implemented by, for example, the above-referenced hardware, the above-referenced processors executing computer-readable code, or a combination of the above-referenced hardware and processors executing computer-readable code.

The decoder 320 may reconstruct an illumination restoration image 380 based on a Lambertian model. The decoder 320 may reconstruct the illumination restoration image 380 by applying the albedo image 350, the surface normal image 360, and the illumination feature 370 output by the encoder 310, to the Lambertian model.

In the deformation model 300 of the auto-encoder, the Lambertian model configuring the decoder 320 may be expressed as shown in Equation 1.

$$I = a \times |\vec{l}| |\vec{n}| \cos(\theta) \quad \text{[Equation 1]}$$

In Equation 1, I denotes an illumination restoration image generated based on the Lambertian model, the operand a denotes an albedo image of a face area appearing in a training image, and the operand $\vec{l}$ denotes a 3D light source as an illumination feature of the face area. The operand $\vec{n}$ denotes a surface normal of the face area and the operand θ denotes an angle of the light source and a surface normal direction.

In a face recognition process, the encoder 310 of the deformation model 300 of the auto-encoder may be used and the decoder 320 may not be used.

Figure 4:
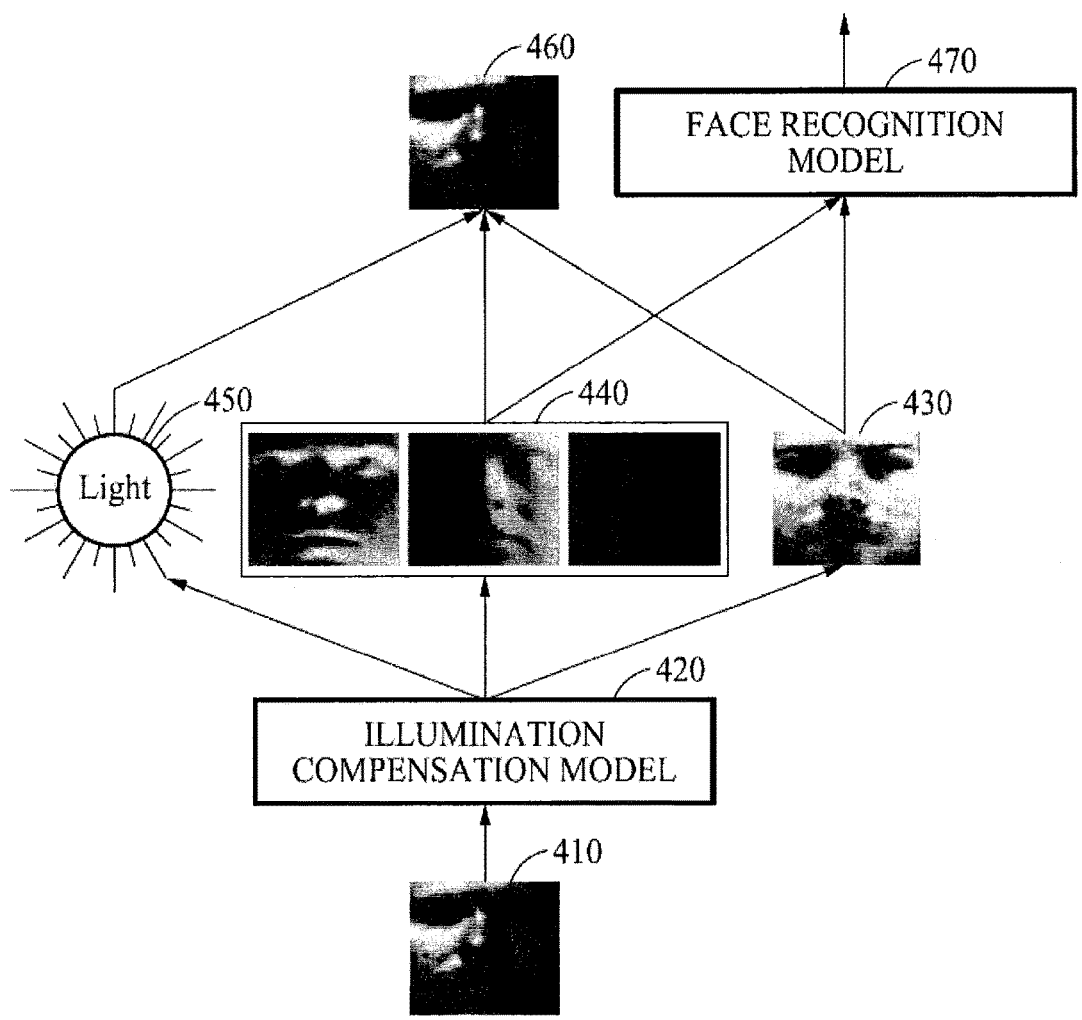
FIG. 4 illustrates an example of training an illumination compensation model and a face recognition model according to at least one example embodiment.

FIG. 4 illustrates an example of training an illumination compensation model and a face recognition model according to at least one example embodiment.

A training apparatus may extract various feature maps from a training image 410 based on an illumination compensation model 420, and generate an illumination restoration image 460 from the feature maps based on a Lambertian model.

The training apparatus may extract, from the training image 410, an albedo image 430, a surface normal image 440, and an illumination feature 450 of a face area appearing in the training image 410. The training apparatus may generate the illumination restoration image 460 from the albedo image 430, the surface normal image 440, and the illumination feature 450 based on the deformation model 300 of the auto-encoder described in FIG. 3.

The training data may determine a loss function of the illumination compensation model 420 based on a difference between the training image 410 and the illumination restoration image 460, and update parameters of the illumination compensation model 420 based on the loss function. The training apparatus may adjust the parameters of the illumination compensation model 420 to reduce the difference between the training image 410 and the illumination restoration image 460 based on the loss function. In such an example, the loss function refers to a function to define an error between a desired value and an estimated value output from the illumination compensation model 420.

The training apparatus may input the albedo image 430 and the surface normal image 440 extracted through the illumination compensation model 420 to a face recognition model 470, and determine a loss function of the face recognition model 470 based on a difference between a desired value corresponding to the input image 410 and an estimated value output from the face recognition model 470. For example, the face recognition model 470 may output an ID value based on the input albedo image 430 and the surface normal image 440. The training apparatus may determine a loss function based on a difference between the ID value output from the face recognition model 470 and a desired ID value (e.g., a correct answer ID), and update the parameters of the face recognition model 470 based on the loss function.

Figure 5:
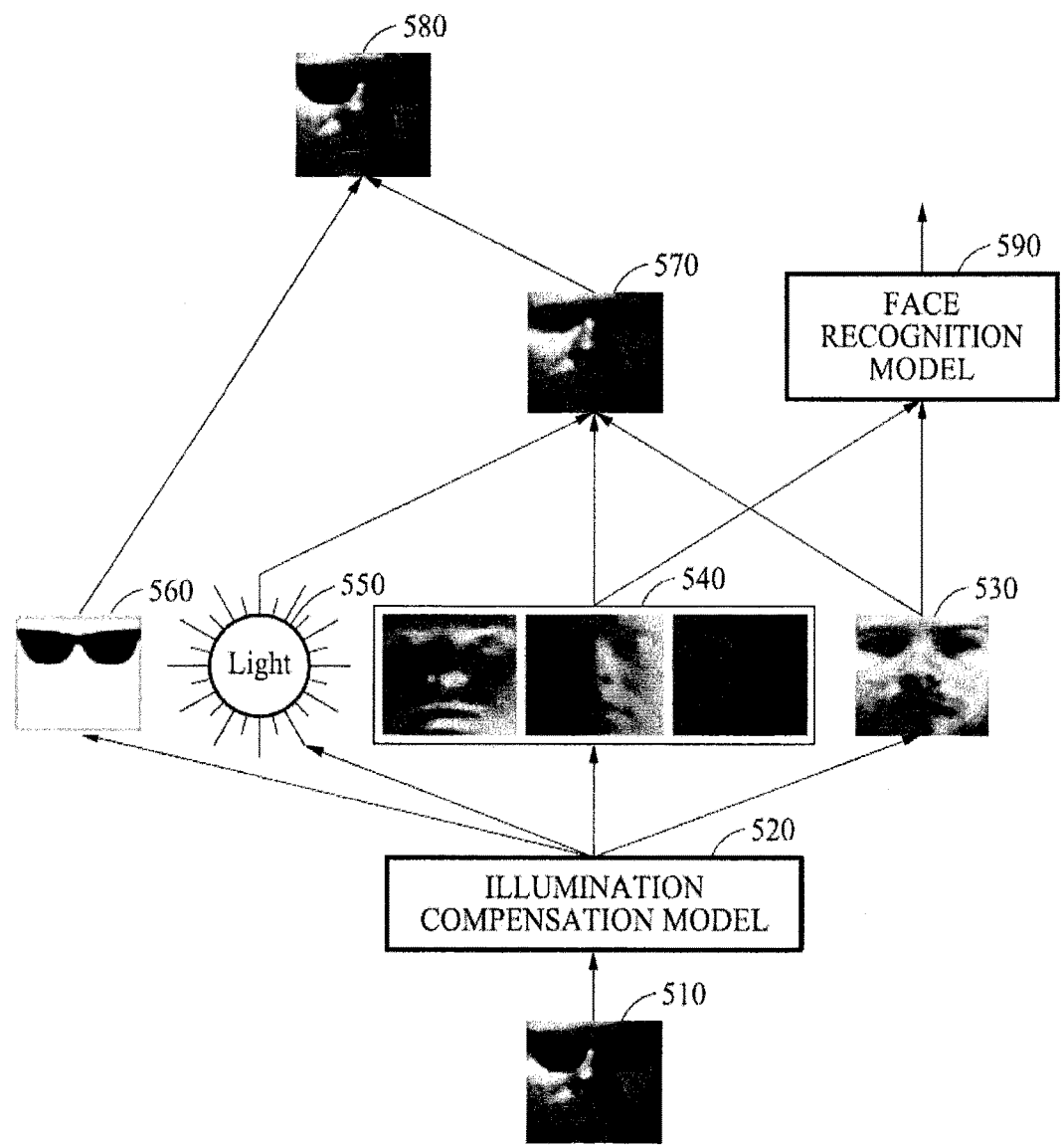
FIG. 5 illustrates another example of training an illumination compensation model and a face recognition model according to at least one example embodiment.

FIG. 5 illustrates another example of training an illumination compensation model and a face recognition model according to at least one example embodiment.

Referring to FIG. 5, an illumination compensation model 520 extracts an albedo image 530, a surface normal image 540, an illumination feature 550, and a mask image 560 from a training image 510. The mask image 560 refers to a mask image having a feature of an occlusion area occluding a face area due to a mask or glasses.

A training apparatus may generate the albedo image 530, the surface normal image 540, and an illumination restoration image 570 based on the illumination feature 550, using the deformation model 300 of the auto-encoder as described above in FIG. 4. Subsequently, the training apparatus may generate a mask restoration image 580 by combining the generated illumination restoration image 570 and the mask image 560.

The training apparatus may determine a loss function of the illumination compensation model 520 based on a difference between the training image 510 and the mask restoration image 580 and update parameters of the illumination compensation model 520 to reduce the difference between the training image 510 and the mask restoration image 580.

Since the aforementioned descriptions provided based on an example of a process of training of a face recognition model 590 are also applicable here, repeated descriptions will be omitted for increased clarity and conciseness.

Figure 6:
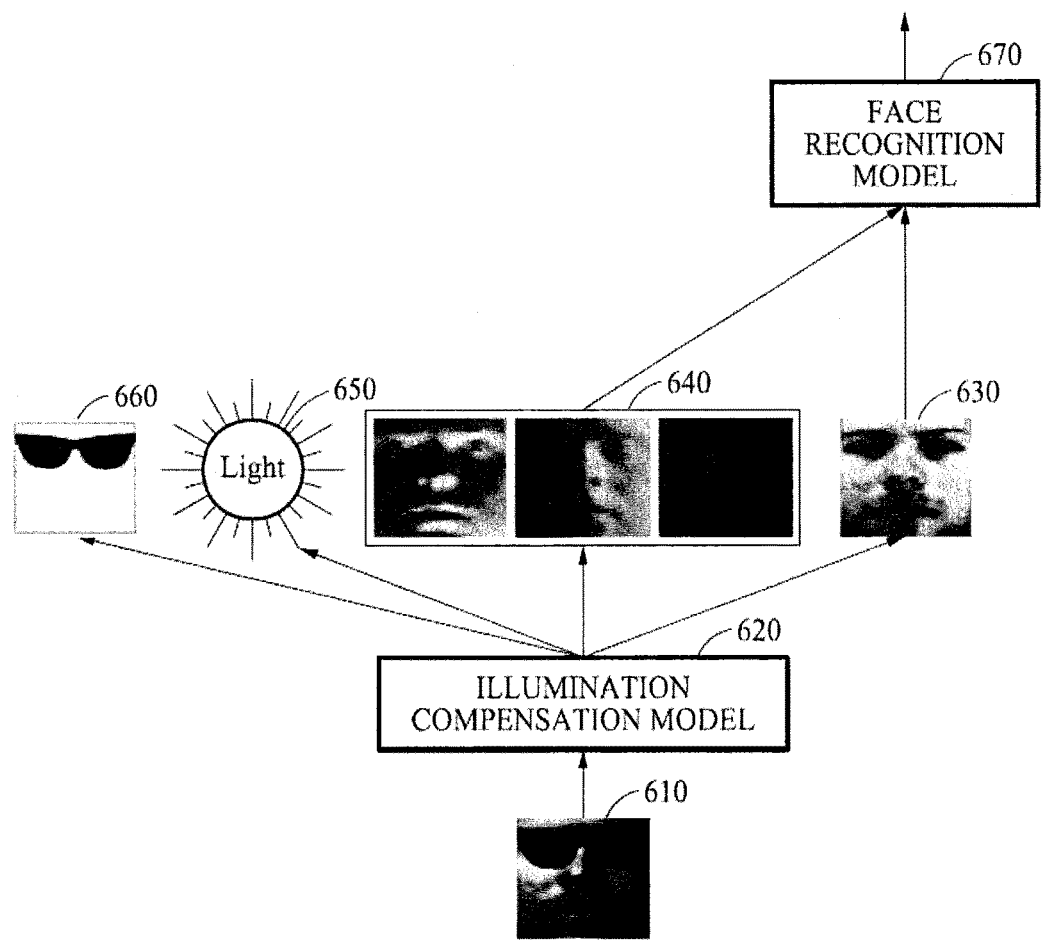
FIG. 6 illustrates an example of performing face recognition according to at least one example embodiment.

FIG. 6 illustrates an example of performing face recognition according to at least one example embodiment.

A face recognition apparatus may perform face recognition on an input image 610 based on an illumination compensation model 620 and a face recognition model 670. The face recognition apparatus may extract an albedo image 640 and a surface normal image 640 of a face area appearing in the input image 610 based on the illumination compensation model 620 when the input image 610 for the face recognition is transmitted.

The face recognition apparatus may input the albedo image 630 and the surface normal image 640 extracted from the illumination compensation model 620 to the face recognition model 670 and may perform the face recognition based on an output value of the face recognition model 670. For example, the face recognition model 670 may output an identification value corresponding to the input image 610, and the face recognition apparatus may identify a user appearing in the input image 610 based on the identification value.

In another example, an enrolled image may be pre-enrolled and stored in advance. The face recognition apparatus may verify whether the user appearing in the input image 610 is an identical user appearing in the enrolled image by comparing the input image 610 to the enrolled image. The face recognition apparatus may extract the albedo image 630 and the surface normal image 640 based on the illumination compensation model 620 with respect to the enrolled image in addition to the input image 610. The face recognition apparatus may obtain a final feature value corresponding to the enrolled image by inputting the extracted albedo image 630 and the surface normal image 640 to the face recognition model 670. The face recognition apparatus may compare a similarity between a final feature value of the input image 610 output by the face recognition model 670 and a final feature value of the enrolled image. When the similarity is greater than or equal to a predetermined threshold, the user appearing in the input image 610 may be verified to be the identical user appearing in the enrolled image. Conversely, when the similarity is less than the predetermined threshold, the face recognition apparatus may verify that the user appearing in the input image 610 differs from the user appearing in the enrolled image.

According to at least one example embodiment, an illumination feature 650 and a mask image 660 may be further extracted from the illumination compensation model 620. However, the face recognition apparatus may perform the face recognition in lieu of using the extracted illumination feature 650 and the mask image 660. Since the albedo image 630 and the surface normal image 640 refer to features independent of an illumination, the face recognition apparatus may perform the face recognition independently of (e.g., without regard to) an illumination appearing in the input image 610. Accordingly, the face recognition apparatus may enhance performance in the face recognition by performing the robust face recognition on a change in the illumination. In addition, the face recognition apparatus may separate the mask image 660 indicating an occlusion area from the input image 610, thereby preventing deterioration in recognition performance due to a face occlusion.

Figure 7:
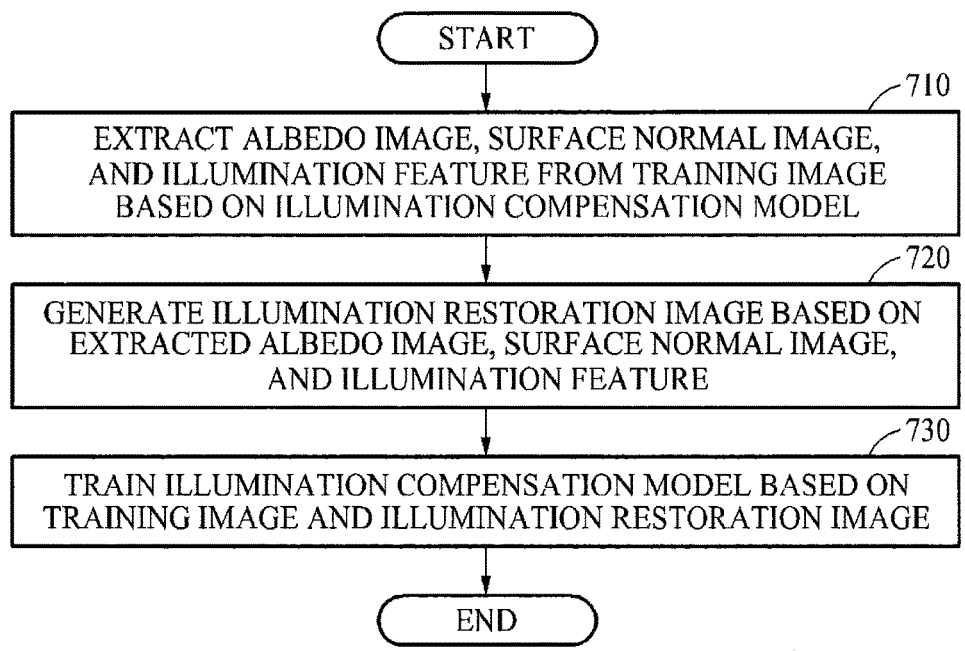
FIG. 7 is a flowchart illustrating an example of a training method of training an illumination compensation model according to at least one example embodiment.

FIG. 7 is a flowchart illustrating an example of a training method of training an illumination compensation model according to at least one example embodiment. In operation 710, a training apparatus extracts an albedo image, a surface normal image, and an illumination feature of a face area from a training image based on an illumination compensation model. In operation 720, the training apparatus generates an illumination restoration image based on the extracted albedo image, the surface normal image, and the illumination feature. For example, the training apparatus may generate an illumination restoration image by applying the albedo image, the surface normal image, and the illumination feature to a Lambertian model. In operation 730, the training apparatus trains the illumination compensation model based on the training image and the illumination restoration image. The training apparatus may determine a loss function based on a difference between the training image and the illumination restoration image and adjust parameters of the illumination compensation model based on the loss function.

Figure 8:
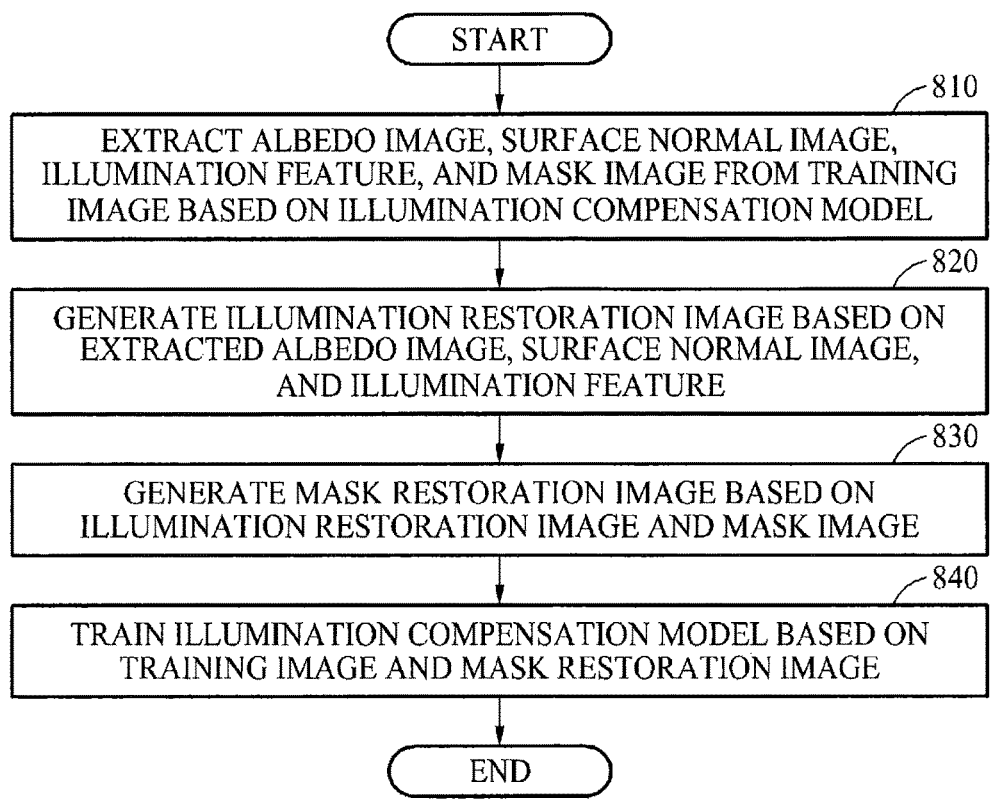
FIG. 8 is a flowchart illustrating another example of a training method of training an illumination compensation model according to at least one example embodiment.

FIG. 8 is a flowchart illustrating another example of a training method of training an illumination compensation model according to at least one example embodiment. In operation 810, a training apparatus extracts an albedo image, a surface normal image, an illumination feature, and a mask image from a training image based on an illumination compensation model. In operation 820, the training apparatus generates an illumination restoration image based on the extracted albedo image, the surface normal image, and the illumination feature. In operation 830, the training apparatus generates a mask restoration image based on the illumination restoration image and the mask image. In operation 840, the training apparatus trains the illumination compensation model based on the training image and the mask restoration image. The training apparatus may determine a loss function based on a difference between the training image and the mask restoration image and adjust parameters of the illumination compensation model based on the loss function.

Figure 9:
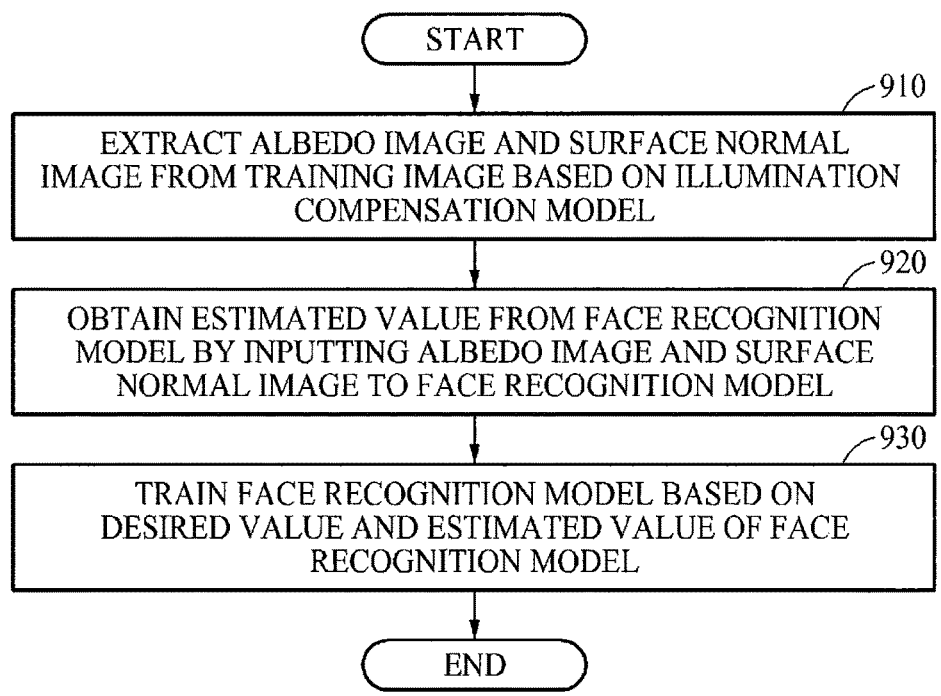
FIG. 9 is a flowchart illustrating an example of a training method of training a face recognition model according to at least one example embodiment.

FIG. 9 is a flowchart illustrating an example of a training method of training a face recognition model according to at least one example embodiment. In operation 910, a training apparatus extracts an albedo image and a surface normal image of a face area from a training image based on an illumination compensation model. In operation 920, the training apparatus obtains an estimated value from a face recognition model by inputting the albedo image and the surface normal image to the face recognition model. In operation 930, the training apparatus trains the face recognition model based on a predetermined desired value and an estimated value of the face recognition model.

Figure 10:
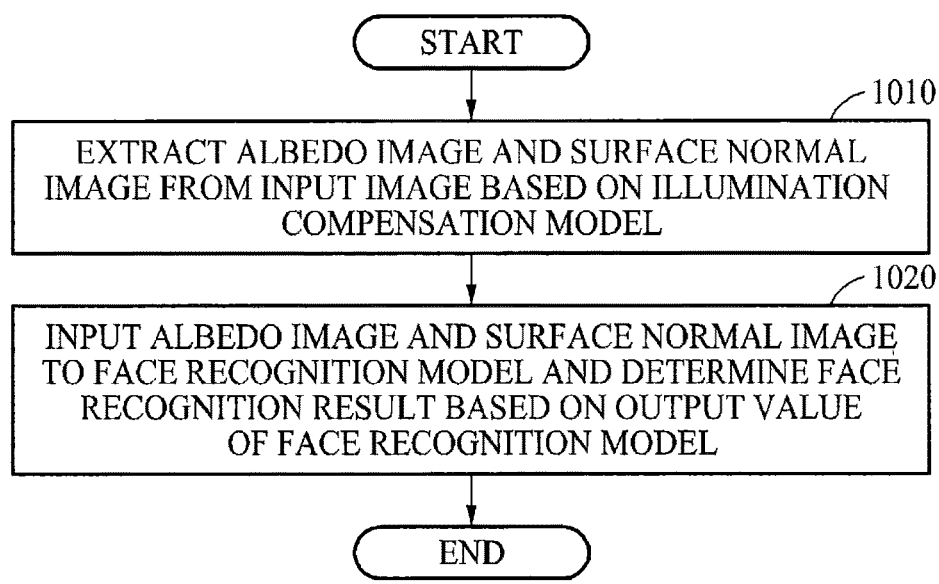
FIG. 10 is a flowchart illustrating an example of a face recognition method according to at least one example embodiment.

FIG. 10 is a flowchart illustrating an example of a face recognition method according to at least one example embodiment. In operation 1010, a face recognition apparatus extracts an albedo image and a surface normal image of a face area from an input image based on an illumination compensation model. In operation 1020, the face recognition apparatus inputs the albedo image and the surface normal image to a face recognition model and determines a face recognition result based on an output value of the face recognition model. For example, the face recognition model may output an identification value corresponding to the input image.

Figure 11:
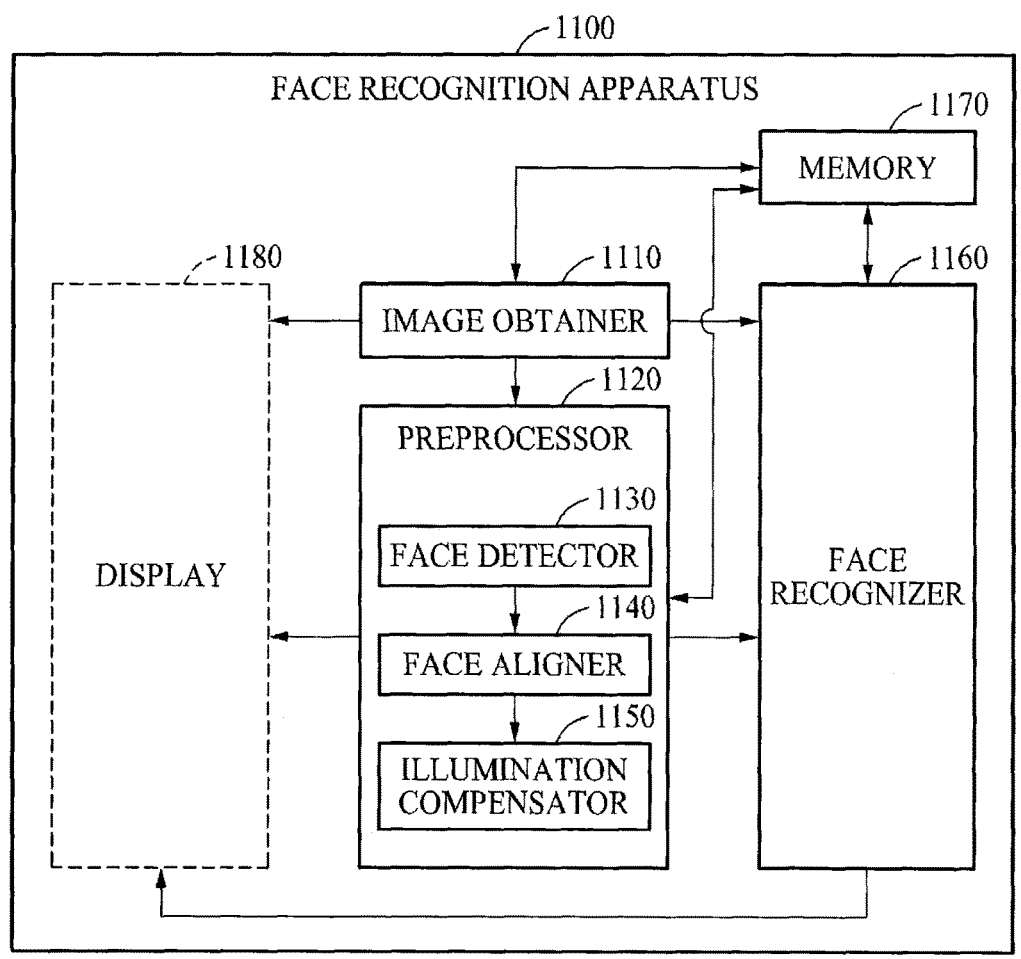
FIG. 11 illustrates another example of a face recognition apparatus according to at least one example embodiment.

FIG. 11 illustrates another example of a face recognition apparatus according to at least one example embodiment. A face recognition apparatus 1100 recognizes a user face appearing in a two-dimensional (2D) input image. Referring to FIG. 11, the face recognition apparatus 1100 includes an image obtainer 1110, a preprocessor 1120, a face recognizer 1160, and a memory 1170 to store a calculated value or a temporary value.

According to at least one example embodiment, the face recognition apparatus 1100 may include or be implemented by one or more circuits or circuitry (e.g., hardware) specifically structured to carry out some or all of the operations described herein as being performed by the face recognition apparatus 1100 (or an element thereof). According to at least one example embodiment, the face recognition apparatus 1100 may include or be implemented by a memory and one or more processors executing computer-readable code (e.g., software) that is stored in the memory and includes instructions corresponding to some or all of the operations described herein as being performed by the face recognition apparatus 1100 (or an element thereof). According to at least one example embodiment, the face recognition apparatus 1100 may be implemented by, for example, a combination of the above-referenced hardware and processors executing computer-readable code.

The image obtainer 1110 obtains an image for user recognition or user authentication through a camera and transmits the obtained image to the preprocessor 1120. The face recognition apparatus 1100 may perform face recognition on a user using a single image. However, the present disclosure is not limited thereto.

The preprocessor 1120 may perform various image preprocessing on an input image received from the image obtainer 1110. The preprocessor 1120 includes a face detector 1130, a face aligner 1140, and an illumination compensator 1150.

The face detector 1130 detects a face area from the input image. The face detector 1130 identifies a face area in the input image based on information on an eye position, a color distribution, a movement of an object, or a brightness distribution in the input image and extracts position information of the face area. For example, the face detector 1130 may detect the face area in the input image using a Haar-like based Adaboost classifier generally used in a related technology field.

The face aligner 1140 adjusts a size of a face appearing in the input image or rotates the face. For example, the face aligner 1140 may extract face components, for example, a nose, eyes, lips, and eyebrows, in the face area based on an active appearance model (AAM). The face aligner 1140 may rotate the face or adjust the size of the face based on positions of the extracted face components.

In addition, the face aligner 1140 may remove an image noise and reduce an influence of an illumination in the input image based on a Gaussian convolution method and histogram smoothing and extension.

The illumination compensator 1150 extracts an illumination component and an occlusion component from the input image and extracts features independent of the illumination. For example, the illumination compensator 1150 may extract an albedo image of the face area and a surface normal image of the face area from the input image based on an illumination compensation model.

The face recognizer 1160 inputs the albedo image and the surface normal image extracted by the preprocessor 1120 to a face recognition model and determines a face recognition result based on an output value of the face recognition model.

According to at least one example embodiment, the face recognizer 1160 performs the face recognition by comparing the input image to an enrolled image. The face recognizer 1160 may perform the face recognition based on a similarity between a face area appearing in the input image and a face area appearing in the enrolled image. The face recognizer 1160 may determine a similarity between a final feature value of the input image output through the face recognition model and a final feature value of the enrolled image and may output the face recognition result based on whether the similarity satisfies a predetermined condition.

For example, in response to a determination that the face recognition succeeds, the face recognition apparatus 1100 may unlock a terminal device connected to the face recognition apparatus 1100 or assign a right to access a predetermined function of the terminal device to the user. In response to a determination that the face recognition fails, the face recognition apparatus 1100 may maintain a locked state of the terminal device or restrict the right to access the predetermined function of the terminal device.

According to at least one example embodiment, the face recognition apparatus 1100 further includes a display 1180. The display 1180 displays at least one of an image obtained by the image obtainer 1110, a result of image preprocessing performed by the preprocessor 1120, an enrolled image, and a face recognition result.

Figure 12:
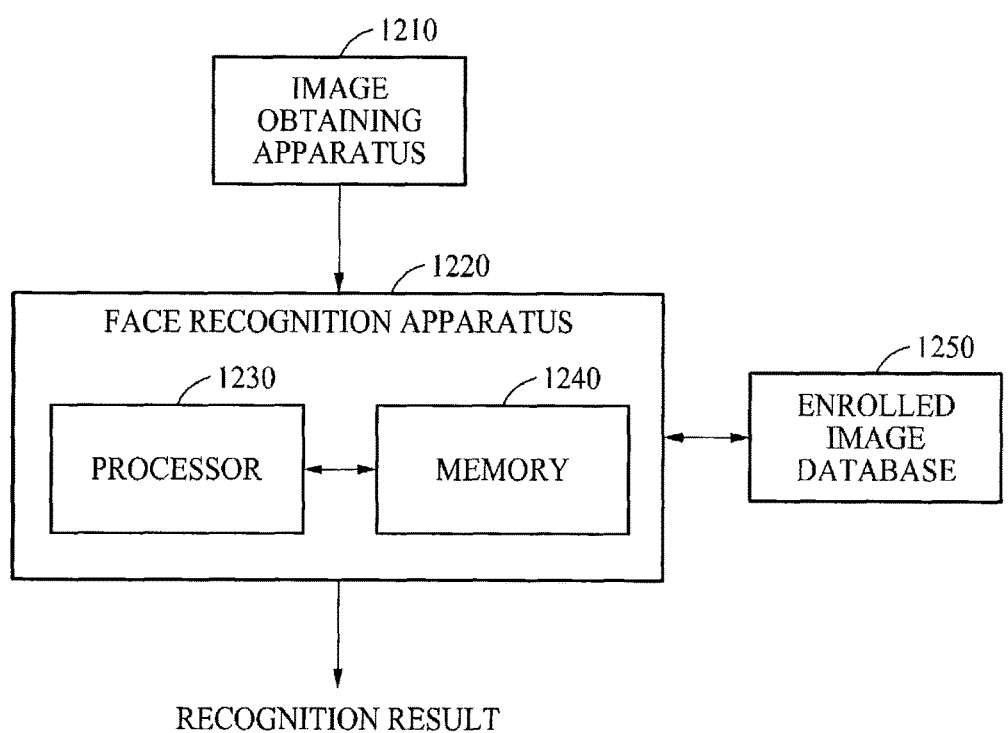
FIG. 12 illustrates still another example of a face recognition apparatus according to at least one example embodiment.

FIG. 12 illustrates still another example of a face recognition apparatus according to at least one example embodiment.

An image obtaining apparatus 1210, for example, a camera, may capture a face of a user and transmit an image including the face to a face recognition. apparatus 1220. The face recognition apparatus 1220 may perform face recognition by comparing the image to an enrolled image stored in an enrolled image database 1250 in advance. The user may enroll an image of the face in advance, through an enrollment. The enrolled image database 1250 may store the enrolled image as an enrolled image.

The face recognition apparatus 1220 may perform at least one face recognition method and learning method described or illustrated herein. The face recognition apparatus 1220 may output the face recognition result in a form of a voice through a speaker or in a form of a character, a drawing, a video, and the like through a display. However, an ex e of the face recognition result is not limited thereto. Thus, the face recognition apparatus 1220 may output the face recognition result in various types of forms.

The face recognition apparatus 1220 may include a processor 1230 and a memory 1240. The memory 1240 may communicate with the processor 1230, and may store data to be computed by the processor 1230 and instructions executable by the processor 1230. The processor 1230 may include hardware for executing the instructions stored in the memory 1240. To execute the instructions, the processor 1230 may retrieve or fetch the instructions from, for example, an internal register, an internal cache, the memory 1240, and a storage, thereby executing the instructions. Subsequently, the processor 1230 may record at least one execution result in the internal register, the internal cache, the memory 1240, and the storage. According to at least one example embodiment, the processor 1230 may execute instructions to perform at least one operation described with reference to FIGS. 2, 6, 10, and 11. For simplification, the single processor 1230 is illustrated in FIG. 12. However, those skilled in art may understand that the processor 1230 includes at least one of processors or cores.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. According to at least some example embodiments, the program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A face recognition method comprising:
    inputting a first input image into an illumination compensation model and outputting, by the illumination compensation model, a first albedo image and a first surface normal image, the illumination compensation model being implemented by a neural network model;
    inputting an enrolled image into the illumination compensation model and outputting, by the illumination compensation model, a second albedo image and a second surface normal image;
    generating a first feature value by inputting the first albedo image and the first surface normal image extracted by the illumination compensation model to a face recognition model and outputting, by the face recognition model, the first feature value;
    generating a second feature value by inputting the second albedo image and the second surface normal image extracted by the illumination compensation model to the face recognition model and outputting, by the face recognition model, the second feature value; and
    determining a face recognition result based on the first and second feature values.

2. The method of claim 1, wherein the determining comprises extracting an illumination component and an occlusion component from the first input image based on the illumination compensation model.

3. The method of claim 1, wherein the illumination compensation model and the face recognition model are based on a convolutional neural network (CNN) model.

4. The method of claim 1, further comprising:
    outputting, from the face recognition model, an identification value corresponding to the first input image based on the first albedo image and the first surface normal image.

5. The method of claim 1, wherein the first albedo image and the first surface normal image are independent of an illumination component comprised in the first input image.

6. The method of claim 1, wherein the first albedo image indicates a texture component of a face area without regard to an illumination of the face area, and
    the first surface normal image indicates a three-dimensional (3D) shape component of the face area without regard to the illumination.

7. A computer program embodied on a non-transitory computer readable medium, the computer program being configured to control a processor to perform the method of claim 1.

8. A face recognition apparatus comprising:
    a memory storing instructions; and
    one or more processors configured to execute the instructions such that the one or more processors are configured to,
        input a first input image into an illumination compensation model and outputting, by the illumination compensation model, a first albedo image and a first surface normal image, the illumination compensation model being implemented by a neural network model;
        input an enrolled image into the illumination compensation model and outputting, by the illumination compensation model, a second albedo image and a second surface normal image;
        generate a first feature value by inputting the first albedo image and the first surface normal image extracted by the illumination compensation model to a face recognition model and outputting, by the face recognition model, the first feature value;
        generate a second feature value by inputting the second albedo image and the second surface normal image extracted by the illumination compensation model to the face recognition model and outputting, by the face recognition model, the second feature value; and determine a face recognition result based on the first and second feature values.

9. The apparatus of claim 8, wherein the one or more processors are configured to execute the instructions such that the one or more processors are configured to extract an illumination component and an occlusion component from the first input image based on the illumination compensation model.

10. The apparatus of claim 8, wherein the illumination compensation model is based on a convolutional neural network (CNN) model applied to an encoder of an auto-encoder.

11. The apparatus of claim 8, wherein the face recognition model is based on a convolutional neural network (CNN) model.

12. A training method of training an illumination compensation model, the method comprising:

extracting, from a training image, an albedo image of a face area, a surface normal image of the face area, and an illumination feature, the extracting being based on an illumination compensation model;

generating an illumination restoration image based on the albedo image, the surface normal image, and the illumination feature; and training the illumination compensation model based on the training image and the illumination restoration image by, determining a loss function based on a difference between the training image and the illumination restoration image, and updating parameters of the illumination compensation model based on the loss function.

13. The method of claim 12, wherein the generating comprises:

generating the illumination restoration image by applying the albedo image, the surface normal image, and the illumination feature to a Lambertian model.

14. The method of claim 12, wherein the training comprises:

updating a parameter of the illumination compensation model based on a difference between the training image and the illumination restoration image.

15. The method of claim 12, wherein the extracting further includes extracting a mask image of the face area from the training image, based on the illumination compensation model.

16. The method of claim 15, further comprising:

generating a mask restoration image based on the illumination restoration image and the mask image, wherein the training includes training the illumination compensation model based on the training image and the mask restoration image.

* * * * *